(12) United States Patent
Vitthaladevuni et al.

(10) Patent No.: US 10,397,944 B2
(45) Date of Patent: Aug. 27, 2019

(54) APPARATUS AND METHOD FOR ESTIMATING DOWNLINK CHANNEL CONDITIONS AT CELL-EDGE

(71) Applicant: QUALCOMM Incorporated, San Diego, CA (US)

(72) Inventors: Pavan Kumar Vitthaladevuni, San Diego, CA (US); June Namgoong, San Diego, CA (US); Joseph Binamira Soriaga, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 19 days.

(21) Appl. No.: 15/382,416

(22) Filed: Dec. 16, 2016

(65) Prior Publication Data

US 2018/0035454 A1 Feb. 1, 2018

Related U.S. Application Data

(60) Provisional application No. 62/367,752, filed on Jul. 28, 2016.

(51) Int. Cl.
*H04W 72/12* (2009.01)
*H04L 1/00* (2006.01)
*H04L 5/00* (2006.01)

(52) U.S. Cl.
CPC ......... *H04W 72/1289* (2013.01); *H04L 1/001* (2013.01); *H04L 5/006* (2013.01); *H04L 5/0048* (2013.01); *H04L 5/0069* (2013.01)

(58) Field of Classification Search
CPC . H04W 72/1289; H04W 72/00; H04W 28/00; H04L 1/001; H04L 5/0048; H04L 5/006; H04L 5/0069
See application file for complete search history.

(56) References Cited

U.S. PATENT DOCUMENTS

| | | | |
|---|---|---|---|
| 9,369,885 B2 | 6/2016 | Bhattad et al. | |
| 2007/0082692 A1 | 4/2007 | Tirkkonen et al. | |
| 2011/0211488 A1* | 9/2011 | Kwon | H04L 5/001 370/252 |
| 2012/0178462 A1* | 7/2012 | Kim | H04W 72/048 455/450 |
| 2013/0176933 A1* | 7/2013 | Seo | H04J 11/0056 370/312 |
| 2014/0092823 A1* | 4/2014 | Song | H04L 1/00 370/329 |

(Continued)

OTHER PUBLICATIONS

International Search Report and Written Opinion—PCT/US2017/043550—ISA/EPO—dated Oct. 20, 2017.

*Primary Examiner* — Kibrom T Hailu
(74) *Attorney, Agent, or Firm* — Loza & Loza, LLP

(57) ABSTRACT

Aspects of the present disclosure provide methods and apparatuses that can utilize different subframe structures to estimate a channel during wireless communication in different scenarios. When a scheduling entity determines that a scheduled entity is near or at a cell edge, the scheduled entity may use a special subframe to estimate the channel utilizing more resources of the subframe, for example data signals. The special subframe can facilitate channel estimation by using a less complex (or lower rank) modulation and coding scheme (MCS) for the data symbols than a normal subframe for other scheduled entities not located near the cell edge.

24 Claims, 11 Drawing Sheets

(56) References Cited

U.S. PATENT DOCUMENTS

| | | | |
|---|---|---|---|
| 2014/0286185 A1* | 9/2014 | Liu | H04L 25/03968 |
| | | | 370/252 |
| 2014/0301251 A1 | 10/2014 | Chen et al. | |
| 2015/0085767 A1 | 3/2015 | Einhaus et al. | |
| 2015/0208421 A1 | 7/2015 | Agiwal et al. | |
| 2015/0222402 A1* | 8/2015 | Ouchi | H04L 1/00 |
| | | | 370/329 |
| 2015/0256359 A1* | 9/2015 | Wang | H04J 11/005 |
| | | | 370/252 |
| 2016/0036618 A1 | 2/2016 | Einhaus et al. | |
| 2016/0081071 A1 | 3/2016 | Song et al. | |
| 2016/0119101 A1* | 4/2016 | Liu | H04L 5/0057 |
| | | | 370/280 |
| 2017/0019218 A1* | 1/2017 | Sadeghi | H04L 5/001 |

\* cited by examiner

APPARATUS AND METHOD FOR ESTIMATING DOWNLINK CHANNEL CONDITIONS AT CELL-EDGE

PRIORITY CLAIM

This application claims priority to and the benefit of provisional patent application No. 62/367,752 filed in the United States Patent and Trademark Office on 28 Jul. 2016, the entire content of which is incorporated herein by reference as if fully set forth below in its entirety and for all applicable purposes.

TECHNICAL FIELD

The technology discussed below relates generally to wireless communication systems, and more particularly, to channel estimation of wireless channels.

INTRODUCTION

Channel estimation, or the estimation of channel conditions, plays an important role in wireless communication. To assist downlink channel estimation, a base station may transmit certain reference signals using predetermined time and/or frequency resources or resource elements. An example of these reference signals is the demodulation reference signal (DMRS), which may be called a user-specific reference signal (RS). Using the DMRS or similar reference signals, a user equipment (UE) can perform channel and/or noise estimation. However, at the cell-edge, due to signal degradation of the reference signals, a user equipment may experience a decrease in signal-to-noise ratio due to channel and/or noise estimation difficulty.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide methods and apparatuses that can utilize different subframe structures to estimate a channel during wireless communication in different scenarios. When a scheduling entity determines that a scheduled entity is near or at a cell edge, the scheduled entity may use a special subframe to estimate the channel utilizing more resources of the subframe, for example data signals. The special subframe can facilitate channel estimation by using a less complex (or lower rank) modulation and coding scheme (MCS) for the data symbols than a normal subframe for other scheduled entities not located near the cell edge.

One aspect of the disclosure provides a method of wireless communication operable at a scheduling entity. The scheduling entity communicates with a plurality of scheduled entities including a first scheduled entity and a second scheduled entity through a downlink (DL) channel. The scheduling entity configures the first scheduled entity to utilize a first subframe structure for estimating the DL channel, and configure the second scheduled entity to utilize a second subframe structure, different from the first subframe structure, for estimating the DL channel. The second subframe structure is configured to provide more resources than the first subframe structure, for estimating the DL channel.

Another aspect of the disclosure provides a method of wireless communication operable at a scheduled entity. The scheduled entity communicates with a scheduling entity utilizing a first subframe structure and a second subframe structure. The scheduled entity estimates a downlink (DL) channel utilizing the first subframe structure in a first process, and estimates the DL channel utilizing the second subframe structure in a second process that is different than the first process. The second subframe structure is configured to provide more resources than the first subframe structure, for estimating the DL channel.

Another aspect of the disclosure provides a scheduling entity for wireless communication. The scheduling entity includes a communication interface configured to communicate with a plurality of scheduled entities, a memory stored with executable code, and a processor operatively coupled to the communication interface and the memory. The processor is configured by the executable code to communicate with the plurality of scheduled entities including a first scheduled entity and a second scheduled entity through a downlink (DL) channel. The processor is further configured to configure the first scheduled entity to utilize a first subframe structure for estimating the DL channel. The processor is further configured to configure the second scheduled entity to utilize a second subframe structure, different from the first subframe structure, for estimating the DL channel. The second subframe structure is configured to provide more resources than the first subframe structure, for estimating the DL channel.

Another aspect of the disclosure provides a scheduled entity for wireless communication. The scheduled entity includes a communication interface configured to communicate with a scheduling entity, a memory stored with executable code, and a processor operatively coupled to the communication interface and the memory. The processor is configured by the executable code to communicate with the scheduling entity utilizing a first subframe structure and a second subframe structure. The processor is further configured to estimate a downlink (DL) channel utilizing the first subframe structure in a first process. The processor is further configured to estimate the DL channel utilizing the second subframe structure in a second process that is different than the first process. The second subframe structure is configured to provide more resources than the first subframe structure, for estimating the DL channel.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide methods and apparatuses that can utilize different subframe structures to estimate a channel during wireless communication in different scenarios. When a scheduling entity determines that a scheduled entity is near or at a cell edge, the scheduled entity may use a special subframe to estimate the channel utilizing more resources of the subframe, for example data signals. In some examples, the special subframe can facilitate channel estimation by using a less complex (or lower rank) modulation and coding scheme (MCS) for the data symbols than a normal subframe for other scheduled entities not located near the cell edge.

Figure 1:
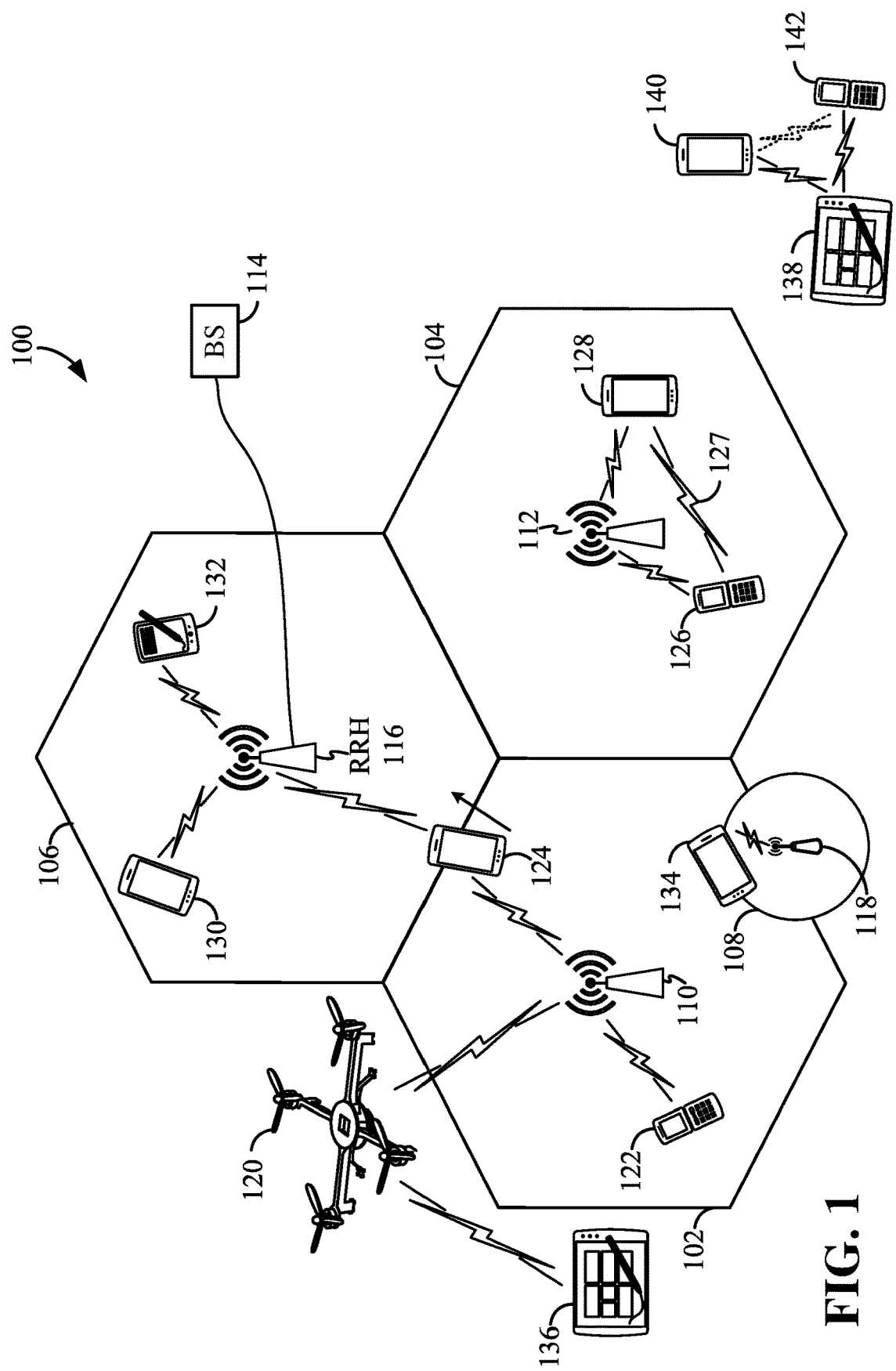
FIG. 1 is a conceptual diagram illustrating an example of an access network according to some aspects of the disclosure.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quad-copter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or data from a base station (e.g., base station 110) to one or more UEs (e.g., UEs 122 and 124) may be referred to as downlink (DL) transmission or DL channel, while transmissions of control information and/or data originating at a UE (e.g., UE 122) may be referred to as uplink (UL) transmissions. In addition, the uplink and/or downlink control information and/or data may be transmitted in transmission time intervals (TTIs). As used herein, the term TTI may refer to the inter-arrival time of a given schedulable set of data. In various examples, a TTI may be configured to carry one or more transport blocks, which are generally the basic data unit exchanged between the physical layer (PHY) and medium access control (MAC) layer (sometimes referred to as a MAC PDU, or protocol data unit). In accordance with various aspects of the present disclosure, a subframe may include one or more TTIs. Thus, as further used herein, the term subframe may refer to an encapsulated set of information including one or more TTIs, which is capable of being independently decoded. Multiple subframes may be grouped together to form a single frame or radio frame. Any suitable number of subframes may occupy a frame. In addition, a subframe may have any suitable duration (e.g., 250 µs, 500 µs, 1 ms, etc.).

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Thus, in a wireless communication network with scheduled access to time-frequency resources and having a cellular configuration, a P2P configuration, or a mesh configuration, a scheduling entity and one or more scheduled entities may communicate utilizing the scheduled resources.

Figure 2:
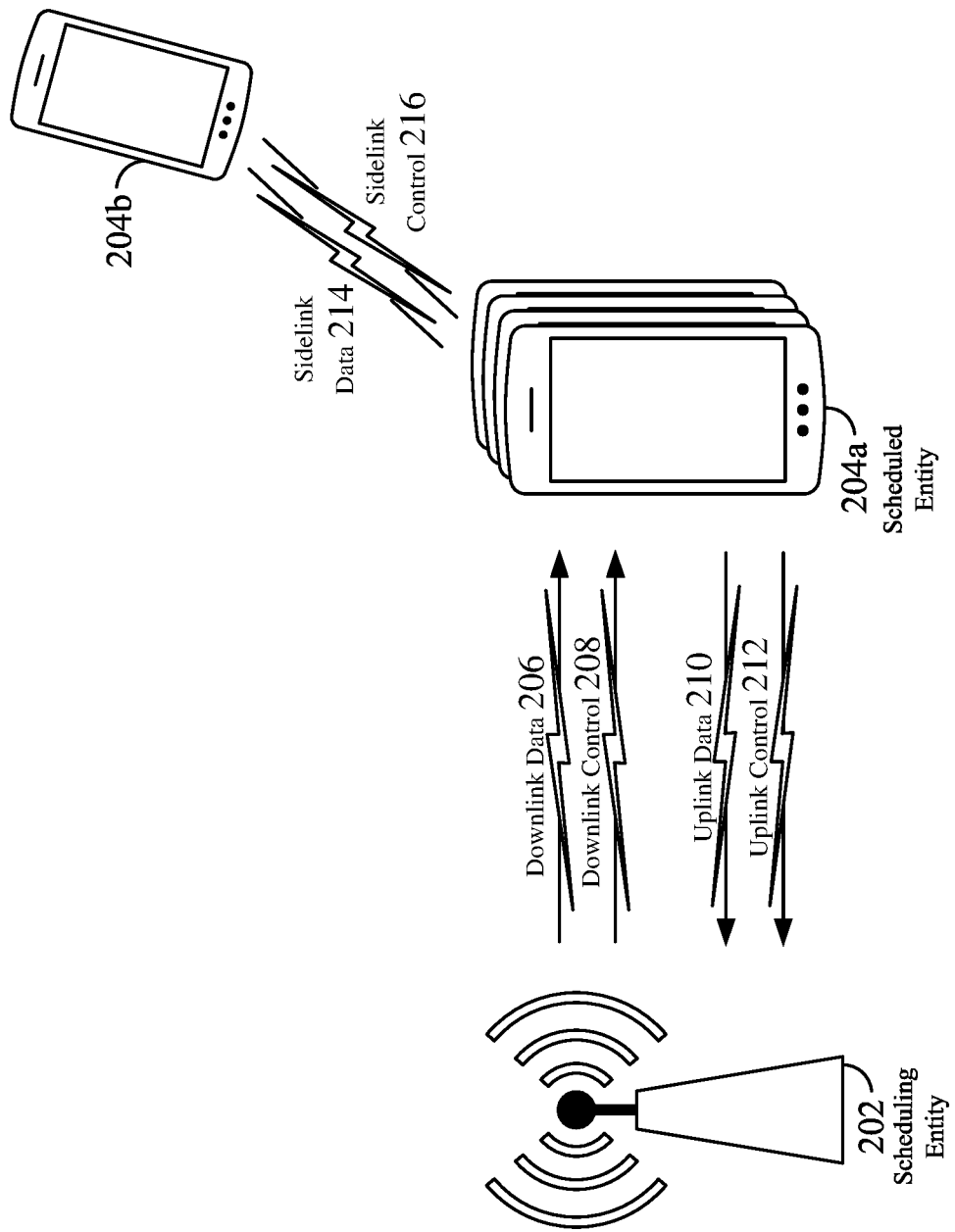
FIG. 2 is a block diagram conceptually illustrating an example of a scheduling entity communicating with one or more scheduled entities according to some aspects of the disclosure.

Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more scheduled entities 204 (the data may be referred to as downlink data). In accordance with certain aspects of the present disclosure, the term downlink (DL) may refer to a point-to-multipoint transmission originating at the scheduling entity 202. Broadly, the scheduling entity 202 is a node or device responsible for scheduling traffic in a wireless communication network, including the downlink transmissions and, in some examples, uplink (UL) data 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink data 210 and/or downlink data 206 including one or more data channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and data information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink data 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink data information 214.

In some examples, the scheduled entity 204 may transmit certain reference signals to the scheduling entity 202 for estimating UL channel quality. Some examples of UL reference signals are sounding reference signal (SRS), demodulation reference signals (DMRS), and the like. These reference signals may be used by the scheduling entity 202 to make decisions for UL resource allocation, link adaptation, and to decode UL data from the scheduled entity. In some examples, the UL SRS may be transmitted by the scheduled entity 204 on one or more symbols (e.g., last symbol) of a subframe. The scheduling entity 202 may use the UL SRS to determine the channel quality and assign UL resources to the scheduled entity 204 based on the channel quality. The scheduling entity 202 may use the UL DMRS for channel estimation and for coherent demodulation. In some examples, the scheduled entity 204 may transmit the UL DMRS on a physical uplink shared channel (PUSCH) or a physical uplink control channel (PUCCH).

In some examples, the scheduling entity 202 may transmit certain reference signals to the scheduled entities 204 for estimating DL channel quality. Some examples of DL reference signals are DL reference signals (DL-RS), UE-specific reference signals (UE-RS), DL DMRS, or the like. DL reference signals will be described in more detail below in relation to FIGS. 5-6.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other data, control, and feedback channels.

Figure 3:
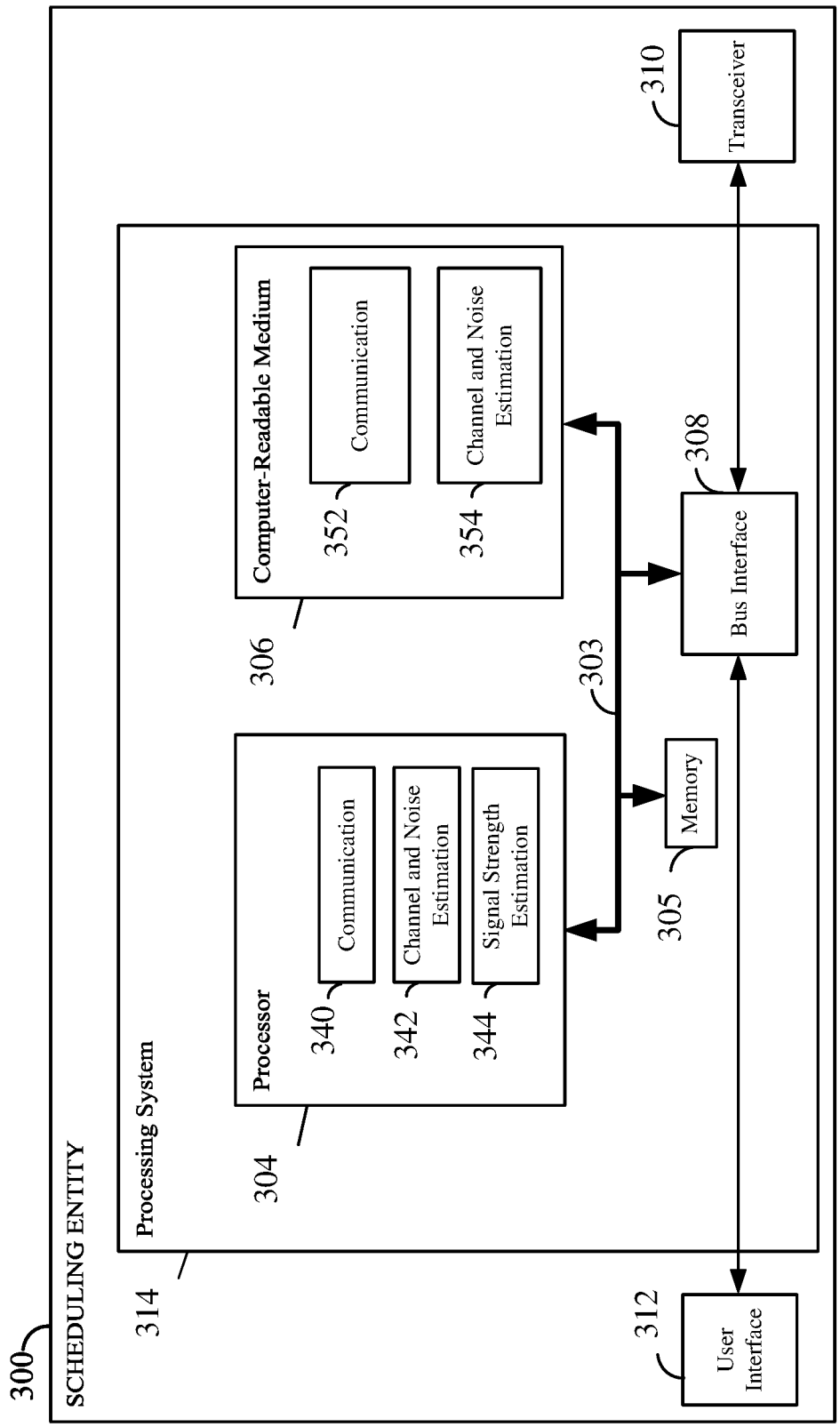
FIG. 3 is a block diagram illustrating an example of a hardware implementation for a scheduling entity according to some aspects of the disclosure.

FIG. 3 is a simplified block diagram illustrating an example of a hardware implementation for a scheduling entity 300 employing a processing system 314. For example, the scheduling entity 300 may be a user equipment (UE) as illustrated in any one or more of FIGS. 1, 2, and/or 9. In another example, the scheduling entity 300 may be a base station as illustrated in any one or more of FIGS. 1, 2, and/or 9.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes described below and illustrated in FIGS. 7-11.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include a communication block 340, a channel and noise estimation block 342, and a signal strength estimation block 344, configured for various functions. For example, they may be configured to implement one or more of the communication and channel estimation functions described below in relation to FIGS. 7-11.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include various software (e.g., communication code 352 and channel and noise estimation code 354) for various functions. For example, when executed, the software configures the processor 304 to perform one or more of the functions described in relation to FIGS. 7-11.

Figure 4:
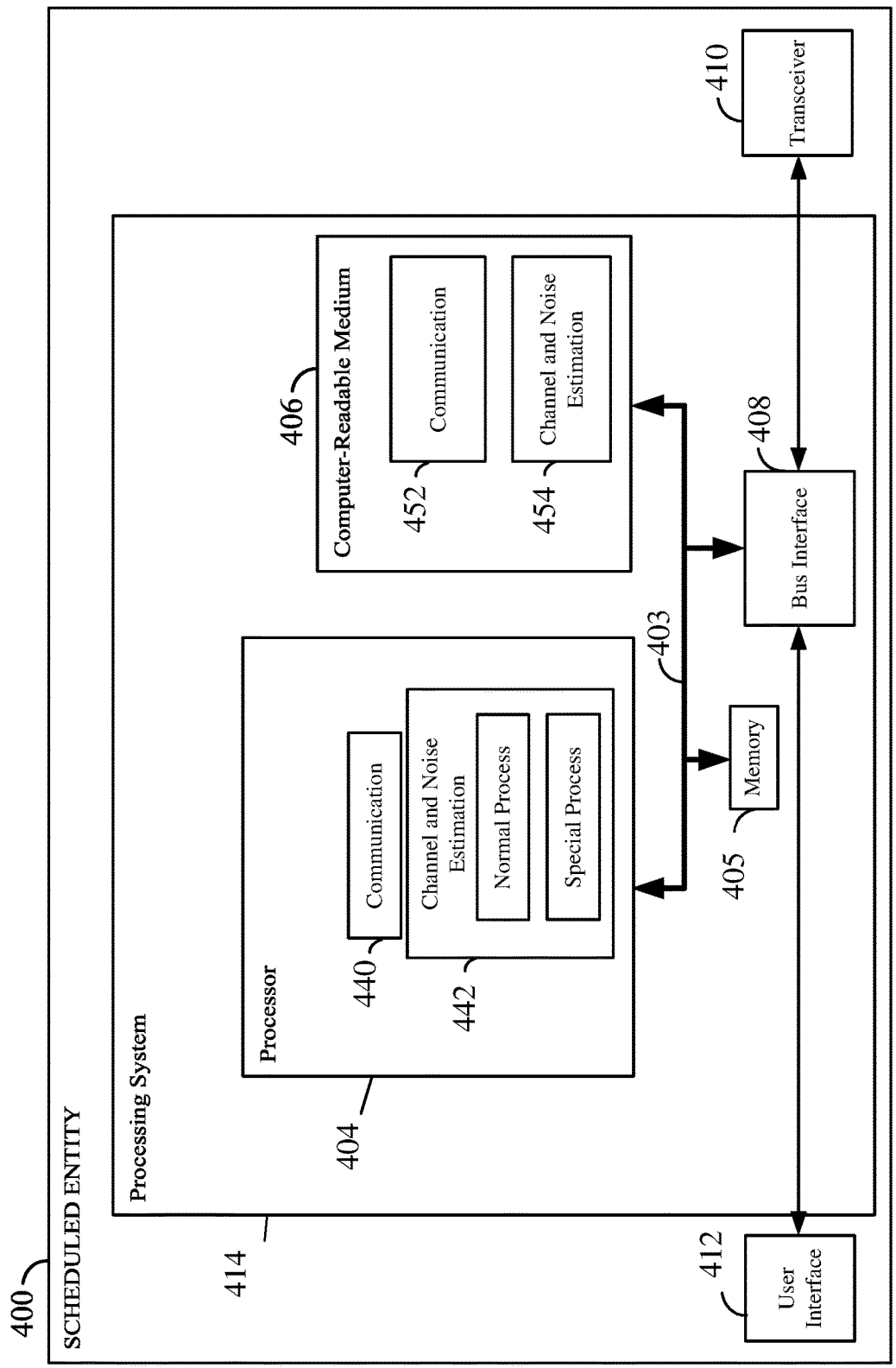
FIG. 4 is a block diagram illustrating an example of a hardware implementation for a scheduled entity according to some aspects of the disclosure.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1, 2, and/or 9.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a transceiver 410 substantially similar to those described above in FIG. 3. In some examples, the transceiver 410 may utilize multiple antennas for transmitting and/or receiving signals. That is, the processor 404, as utilized in a scheduled entity 400, may be used to implement any one or more of the processes described below and illustrated in relation to FIGS. 7-11.

In some aspects of the disclosure, the processor 404 may include a communication block 440 and a channel and noise estimation block 442 configured for various functions, including, for example, one or more of the functions described below in relation to FIGS. 7-11. In one or more aspects of the disclosure, the computer-readable storage medium 406 may include various software (e.g., communication code 452 and channel and noise estimation code 454) for various functions. For example, when executed, the software configures the processor 404 to perform one or more of the functions described in relation to FIGS. 7-11.

In some aspects of the disclosure, the access network 100 may be implemented to utilize OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference.

Figure 5:
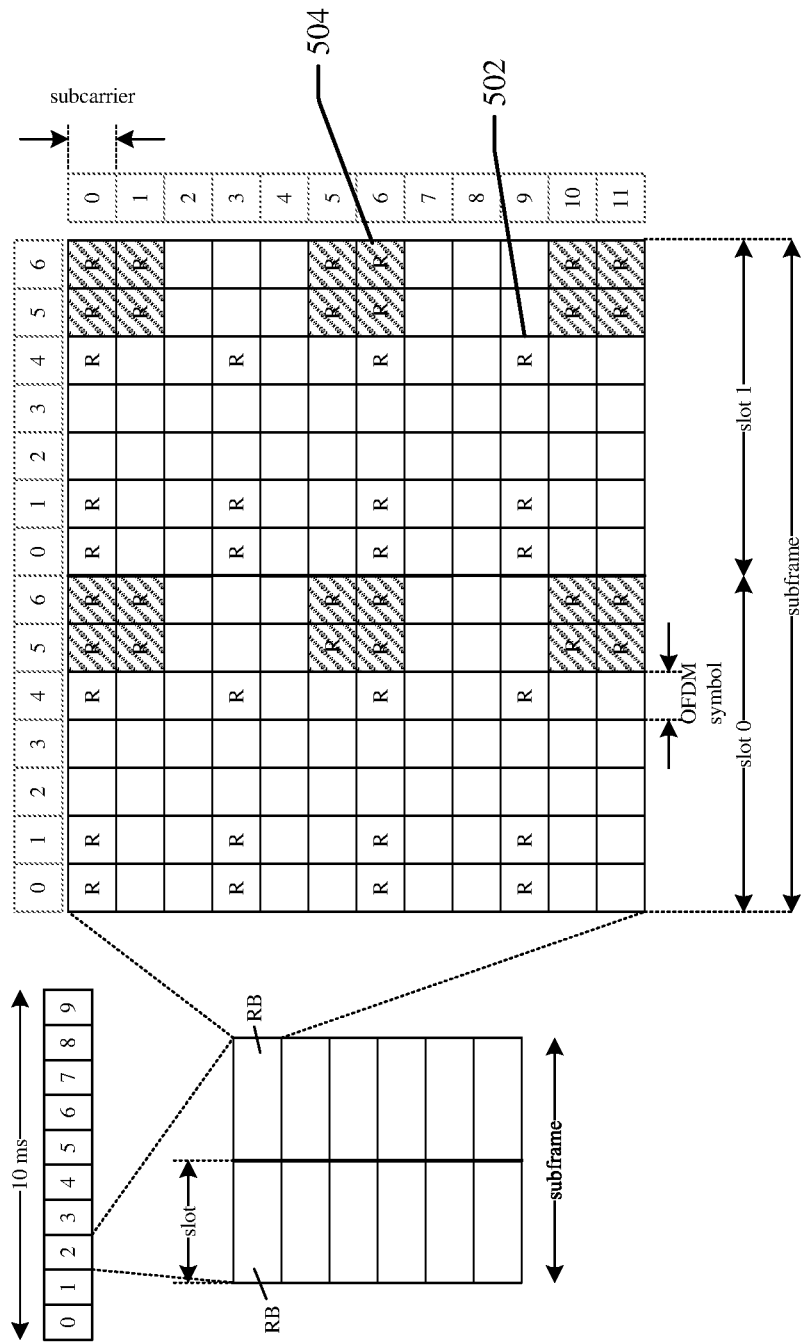
FIG. 5 is a diagram illustrating a resource grid of a normal downlink subframe according to some aspects of the disclosure.

Various frame structures may be used to support DL transmissions from a scheduling entity. An example of a DL frame structure is illustrated in FIG. 5. However, as those skilled in the art will readily appreciate, the frame structure for any particular application may be different depending on any number of factors. In this example, a frame (e.g., 10 ms frame) is divided into ten equally sized sub-frames (sub-frames 0 through 9). In this example, each sub-frame includes two consecutive time slots (e.g., slot 0 and slot 1 in FIG. 5).

Referring to FIG. 5, a resource grid may be used to represent two time slots, each time slot including a resource block. The resource grid is divided into multiple resource elements. In some examples, a resource block may contain twelve consecutive subcarriers in the frequency domain (vertical direction in FIG. 5) and, for a normal cyclic prefix in each OFDM symbol, seven consecutive OFDM symbols in the time domain (horizontal direction FIG. 5), or eighty-four resource elements (REs). Some of the resource elements, as indicated as R 502, 504 in FIG. 5, include DL reference signals (DL-RS). For example, the DL-RS may include cell-specific reference signals 502 and UE-specific reference signals (UE-RS) 504, also known as demodulation reference signals (DMRS). A scheduled entity (e.g., a UE) may use the DMRS for channel and noise estimation.

In some examples, the scheduled entity may utilize a minimum mean squared error (MMSE-IRC) receiver that may be included in the transceiver 410. The MMSE-IRC receiver is configured to use multiple receiver antennas to create null points in the arrival direction of the interference signal to suppress the interference signal, thereby improving the signal-to-interference-plus-noise ratio (SINR) and/or improving throughput performance. In some scenarios, however, when the scheduled entity (e.g., UE 126 of FIG. 1) is located at or near the cell edge, noise becomes a significant contributor to degradation in the downlink (DL) SINR.

In one aspect of the disclosure, the received signal may be represented as equation 1:

$$y = Hx + n \quad (1)$$

In equation 1, y is the received signal, H is the channel matrix, x is the transmitted signal, and n is the noise. The noise n may be estimated or determined as the expectation value Rnn, and the received signal may be determined as the expectation value Ryy. Rnn may be determined as E(nn*), which is the mean of n times its complex conjugate n*. Ryy may be determined as E(yy*), which is the mean of y times its complex conjugate y*. In some examples, both Rnn and Ryy may be measured or estimated using reference signals, for example, DMRS. In some aspects of the disclosure, the reference signals may be transmitted using one or more REs. The scheduled entity may use the noise and channel estimates obtained from the DMRS to facilitate decoding, re-encoding, reconstructing, and canceling out the noise of the channels.

Use of a greater number of resources (e.g., data symbols, dimensions, or tones) or averaging for noise (e.g., Rnn) and/or channel (e.g., Ryy) estimation may improve communication performance at the cell edge. However, for example in LTE, only a limited number of reference signals (e.g., DMRS) or resources are available in the DL subframes for channel estimation. Therefore, changing the amount of averaging in noise estimation alone may not be sufficient to solve the channel and/or noise estimation problems at the cell edge.

In some aspects of the disclosure, different from LTE, a scheduled entity may sample and decode the data signals (e.g., data symbols, dimensions, or portion) of the DL transmission or subframes. Then the scheduled entity may estimate the channel and/or noise using the decoded data signals as well as the reference signals. Using both the reference signals and data signals to estimate the channel and/or noise can improve UE performance at the cell edge. In this case, the scheduled entity uses a different process (i.e., special process) to estimate the channel by using both the reference signals (e.g., DMRS) and data signals. To facility this special process, a serving cell and neighbor cell(s) coordinate to transmit a special subframe to the scheduled entity located at or near the cell edge. The scheduling entities may switch to using the special subframe when it is detected that a scheduled entity is located at or near the cell edge. For example, if a serving cell 104 (see FIG. 1) and the neighbor cells (e.g., cells 102 and 106 of FIG. 1) of a scheduled entity (e.g., a UE) are all transmitting a special subframe using a lower modulation and coding scheme (MCS), then it is easier for the scheduled entity to use the data signals of the special subframe for channel and/or noise estimation, giving better averaging results. For other scheduled entities not located near the cell edge, the scheduling entities may continue to use the normal subframe which has a higher MCS for more efficient use of the bandwidth. Since the serving cell and neighbor cells are all using the same special subframe for serving the scheduled entities at or near the cell edge, there will be less interference for these cell-edge scheduled entities. Using a lower MCS for the special subframe can facilitate or simplify the process for estimating the channel.

Figure 6:
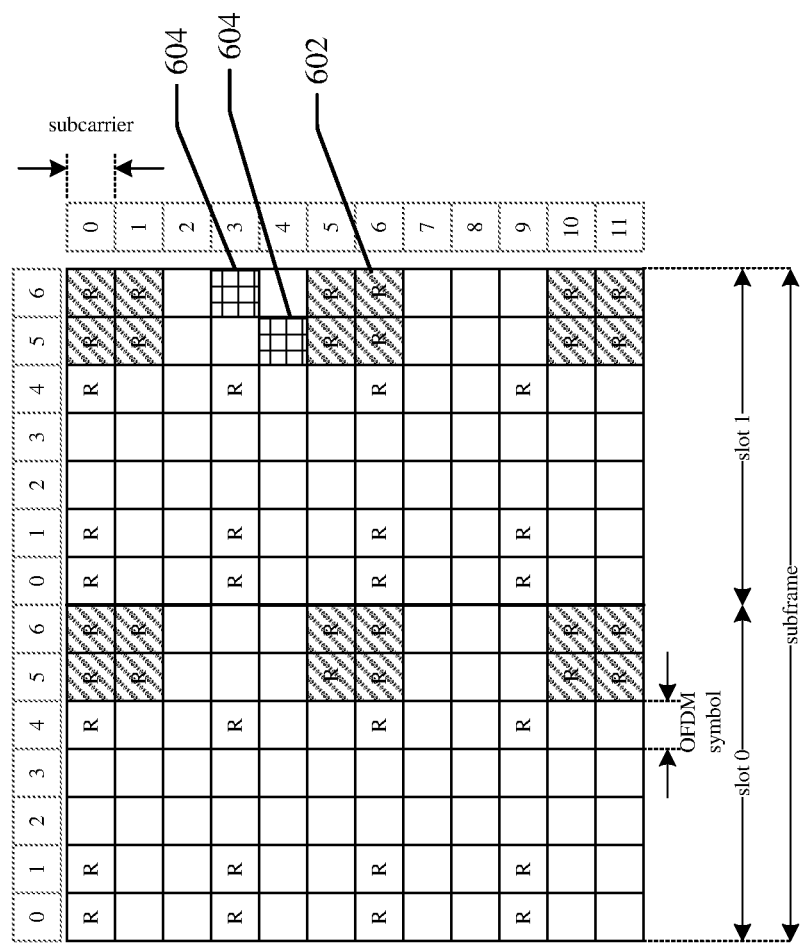
FIG. 6 is a diagram illustrating a resource grid of a special downlink subframe according to some aspects of the disclosure.

FIG. 6 is an exemplary resource grid illustrating a special subframe 600 according to some aspects of the disclosure. This resource grid is similar to that of FIG. 5, and therefore redundant description will be omitted. Some of the resource elements are configured to provide DMRS 602. In this example, this special subframe 600 may employ quadrature phase shift keying (QPSK) modulation or any modulation that has lower efficiency (lower information rate) than that of a non-special subframe (e.g., the subframe of FIG. 5). The special subframe 600 may also use a lower coding rate than the non-special subframe. Using a MCS with a lower information rate allows a scheduled entity to use both the DMRS 602 and data signals 604 for channel and noise estimation.

Figure 7:
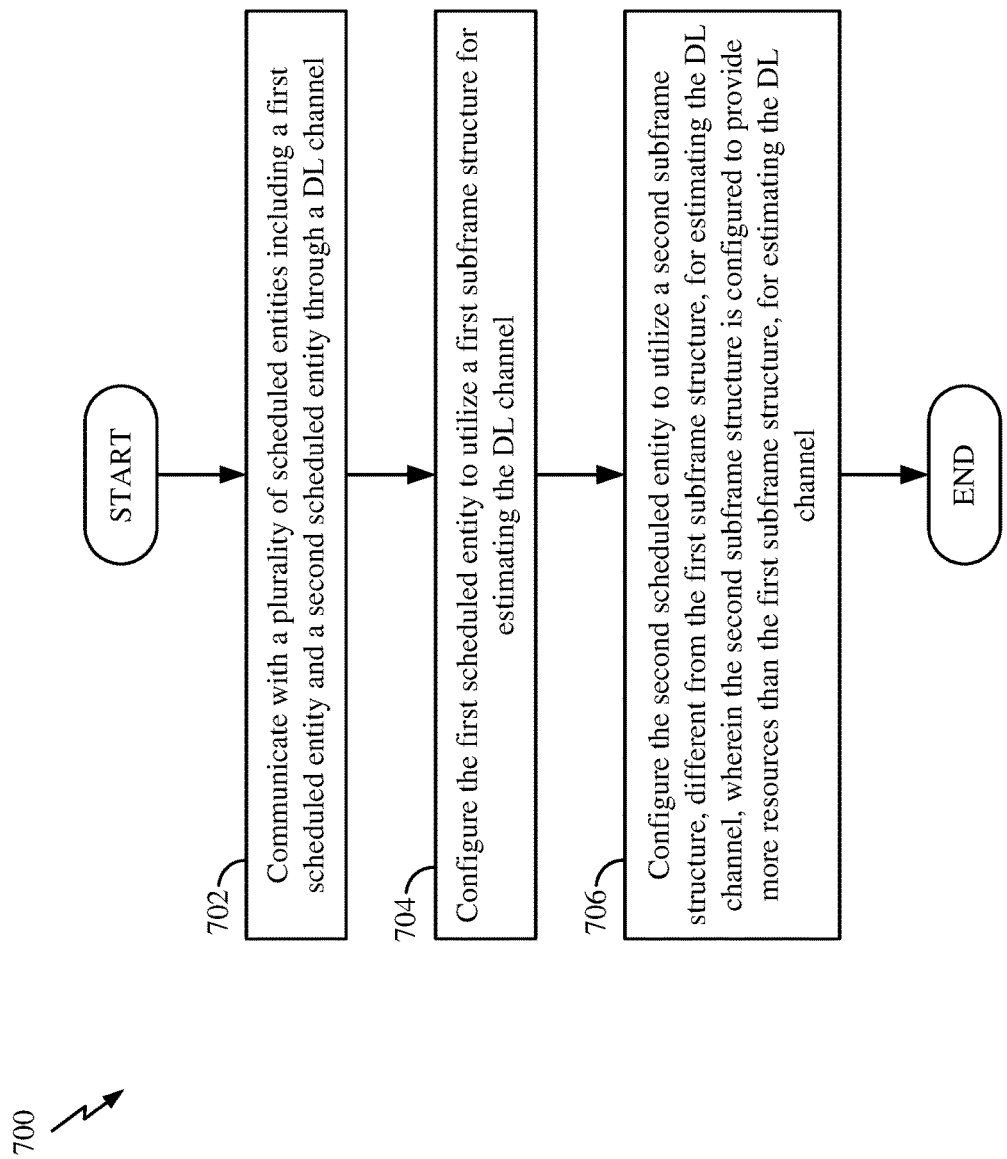
FIG. 7 is a flow chart illustrating an exemplary process for using a special subframe to estimate a communication channel according to some aspects of the disclosure.

FIG. 7 is a flow chart illustrating an exemplary channel and noise estimation process 700 operable at a scheduling entity configured to use different subframes to estimate channel and/or noise of a communication channel according to some aspects of the disclosure. In some examples, the channel and noise estimation process 700 may be performed by any of the scheduling entities as illustrated in FIGS. 1-3 or other devices.

At block 702, a scheduling entity may communicate with a plurality of scheduled entities including a first scheduled entity and a second scheduled entity through a communication channel. For example, the scheduling entity may utilize the communication block 340 and transceiver 310 to communicate with a plurality of scheduled entities through a DL channel. At block 704, the scheduling entity may configure the first scheduled entity to utilize a first subframe structure for estimating the DL channel. For example, the scheduling entity may utilize the channel and noise estimation block 342 to send control information to the first scheduled entity to utilize a subframe structure similar to the subframe structure 500 illustrated in FIG. 5. At block 706, the scheduling entity may configure the second scheduled entity to utilize a second subframe structure, different from the first subframe structure, for estimating the DL channel. For example, the second subframe structure may be the same as the subframe structure 600 illustrated in FIG. 6. The second subframe structure is configured to provide more resources than the first subframe structure, for estimating the DL channel. In some aspects of the disclosure, the resources of the second subframe structure may include DMRS 602 and data signals 604 that may be used by the scheduled entity for channel and noise estimation.

Figure 8:
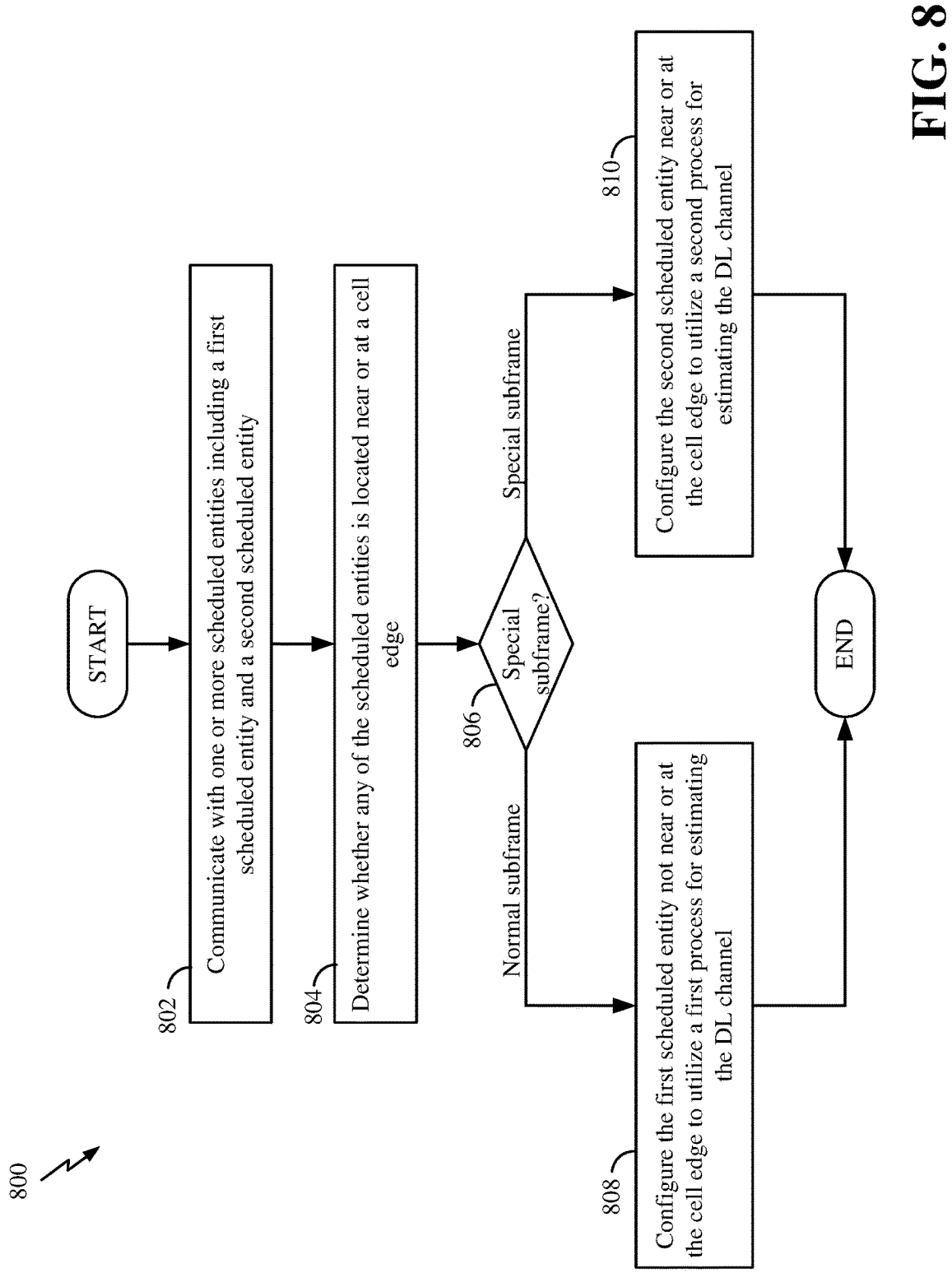
FIG. 8 is a flow chart illustrating an exemplary process for determining when to use a special subframe to estimate a communication channel according to some aspects of the disclosure.

FIG. 8 is a flow chart illustrating an exemplary process 800 operable at a scheduling entity to determine whether to use a special subframe to estimate channel and/or noise of a communication channel according to some aspects of the disclosure. In some examples, the process 800 may be performed by any of the scheduling entities as illustrated in FIGS. 1-3 or other devices. In some examples, some or all portions of the process 800 may be used or combined with the channel and noise estimation process 700 described above in relation to FIG. 7.

At block 802, a scheduling entity may communicate with one or more scheduled entities including a first scheduled entity and a second scheduled entity (e.g., UEs 126 and 128 of FIG. 1). In some examples, the scheduling entity may be a serving base station or cell (e.g., cells 102, 104, or 106). At block 804, the scheduling entity may utilize the signal strength estimation block 344 (see FIG. 3) to determine whether any of the scheduled entities is located near or at the cell edge of the scheduling entity. For example, the scheduling entity may utilize uplink (UL) reference signals transmitted by a scheduled entity to determine whether the scheduled entity is near or at the cell edge. Some examples of UL reference signals are UL sounding reference signal (SRS) and UL DMRS. The scheduled entity may transmit the UL DMRS on a UL channel such as PUSCH or PUCCH. Based on the received signal strength (e.g., corresponding to a path loss) or signal quality of the UL reference signals from a scheduled entity, the scheduling entity may determine whether that scheduled entity is near or at the cell edge.

At decision block 806, the scheduling entity decides whether to transmit a normal subframe or a special subframe to a certain scheduled entity. The special subframe may use a MCS lower than that of the normal subframe (default subframe). The special subframe may be the same as the special subframe illustrated in FIG. 6. The normal subframe may be the same the subframe illustrated in FIG. 5. The special subframe utilizes a lower MCS than the normal subframe. A lower MCS refers to an MCS that utilizes a less complex modulation and/or a lower coding rate. Therefore, a lower MCS may result in lower utilization of the wireless spectrum and/or lower information rate. In one example, the special subframe may utilize QPSK modulation or the like. In one aspect of the disclosure, the scheduling entity transmits the special subframe to subordinate entities located at or near the cell edge; otherwise, the scheduling entity transmits the normal subframe to subordinate entities not located at or near the cell edge (e.g., near cell center). In some aspects of the disclosure, the scheduling entity may determine whether to transmit the special subframe or normal subframe to a subordinate entity based on the channel quality, received signal strength, and/or path loss.

At block 808, the scheduling entity may configure the first scheduled entity that is not near or at the cell edge to utilize a first process for estimating the DL channel. The first process (default process) may be any typical processes known in the art that may be used to estimate the received signal and/or noise of the DL channel. For example, in the first process, the scheduled entity may utilize the DL reference signals (e.g., R 502 and 504 of FIG. 5) included in a normal subframe to estimate the covariance of the received signal (Ryy) and noise (Rnn) of the DL channel.

At block 810, the scheduling entity may configure the second scheduled entity that is located near or at the cell edge to utilize a second process (a special process) for estimating the DL channel. For example, the scheduling entity may send downlink control information (DCI) or an upper-layer control message (e.g., a radio resource control (RRC) message) to indicate that the scheduled entity may use a special process, that is different from the first process of block 808, to estimate the covariance of the received signal (Ryy) and/or noise (Rnn) using the special subframe. In the special process, the scheduled entity may use the DL data portion (e.g., payload data 604) of the special subframe to estimate the covariance of the Ryy and/or Rnn of the channel.

Figure 9:
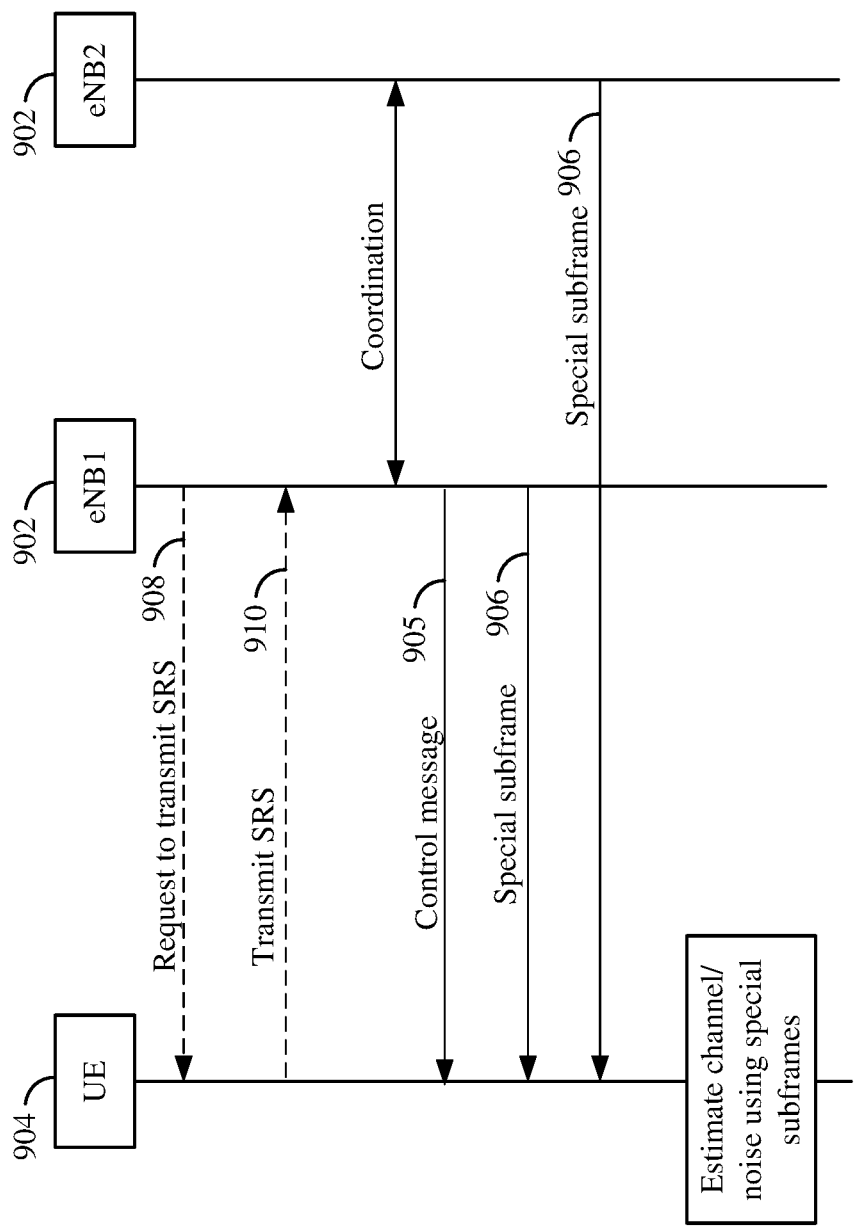
FIG. 9 is a diagram illustrating communication between scheduling entities and a scheduled entity according to some aspects of the disclosure.

In one aspect of the disclosure, referring to FIG. 9, one or more scheduling entities 902 (e.g., base stations 110, 112, and 116 of FIG. 1) may coordinate together to serve the scheduled entities (e.g., UE 904) near or at the cell edge by transmitting subframes (e.g., special subframes) using a lower or less complex MCS. One or more of the scheduling entities may send a control message 905 to configure the scheduled entity to use a special frame to estimate the channel. For example, the special subframe 906 may be modulated with QPSK MSC or the like such that the data signals (e.g., data tones, symbols, or dimensions) of the special subframes as well as the reference signals may be used to estimate the covariance of the received signal (Ryy) and/or noise (Rnn). Therefore, the scheduled entity 904 when located at or near the cell edge, may get a better estimate of the channel when using the special subframes. In some aspects of the disclosure, the scheduling entity may request 908 (e.g., using upper-layer control messages) the scheduled entity near or at the cell edge to sound or transmit a reference signal 910 (e.g., SRS) on an uplink-centric part of an earlier subframe before scheduling the scheduled entity 904 to use the special subframe/process for estimating the channel. The earlier subframe may be an UL-centric subframe in which a majority of the subframe is used for UL transmission.

Figure 10:
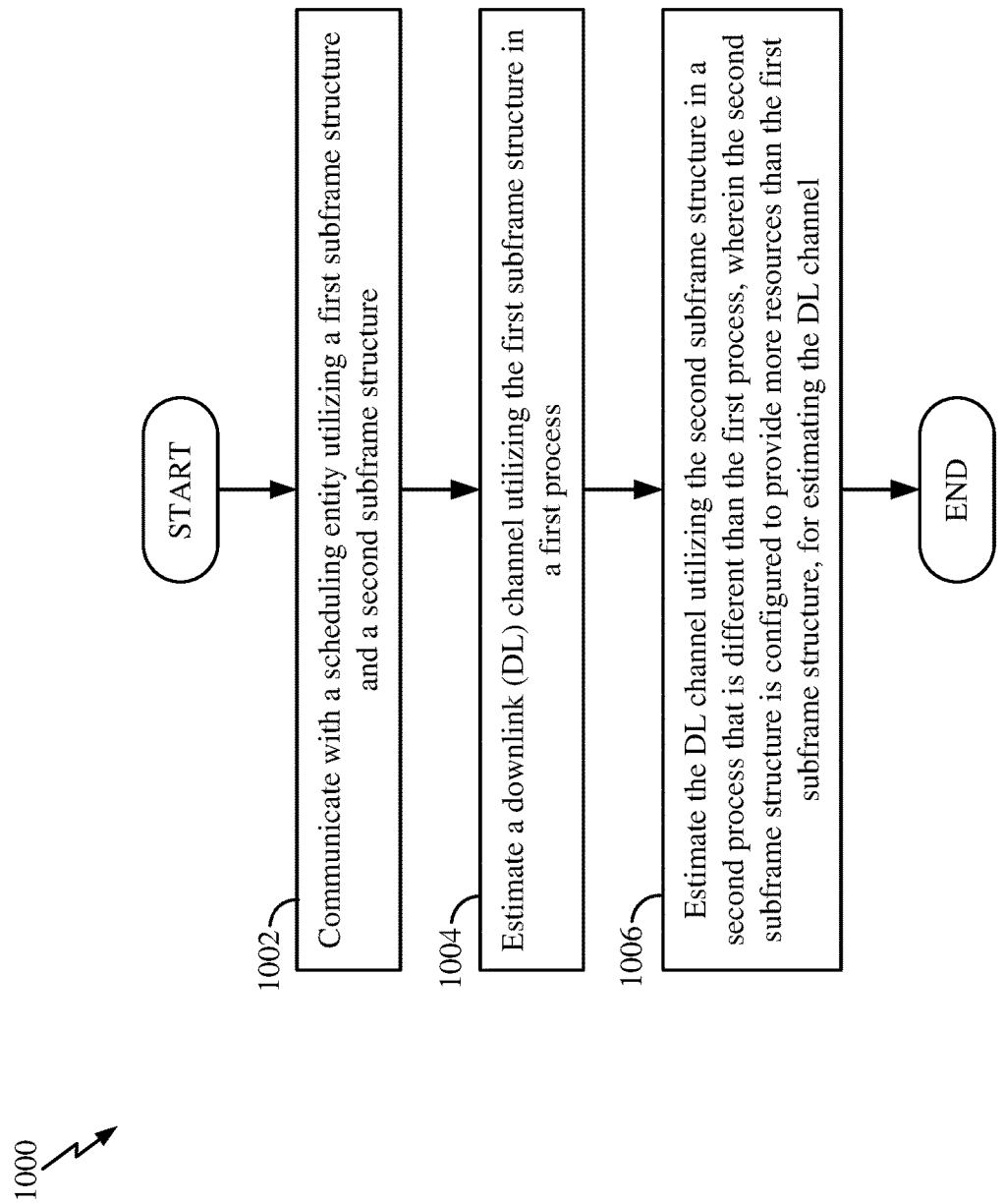
FIG. 10 is a flow chart illustrating an exemplary process for using a special subframe to estimate a communication channel according to some aspects of the disclosure.

FIG. 10 is a flow chart illustrating an exemplary process 1000 operable at a scheduled entity that can use a special subframe to estimate a DL channel according to some aspects of the disclosure. In some examples, the process 1000 may be performed by any of the scheduled entities or UEs illustrated in FIGS. 1, 2, 4, and/or 9. At block 1002, the scheduled entity may communicate with a scheduling entity utilizing a first subframe structure and a second subframe structure. For example, the scheduled entity may utilize the communication block 440 and transceiver 410 to communicate with the scheduling entity. The first subframe structure may be the same as the subframe structure illustrated in FIG. 5, and the second subframe structure may be the same as the subframe structure shown in FIG. 6.

At block 1004, the scheduled entity may estimate a communication channel utilizing the first subframe structure in a first process. In one example, the scheduled entity may utilize the channel and noise estimation block 442 to estimate a DL channel. At block 1006, the scheduled entity may estimate the DL channel utilizing the second subframe structure in a second process that is different than the first process. In this case, the second subframe structure is configured to provide more resources than the first subframe structure, for estimating the DL channel. For example, the second subframe may have a lower or less complex MCS than that of the first subframe. With the lower MCS, the scheduled entity may utilize the reference signals and data portions of the second subframe to estimate the channel.

Figure 11:
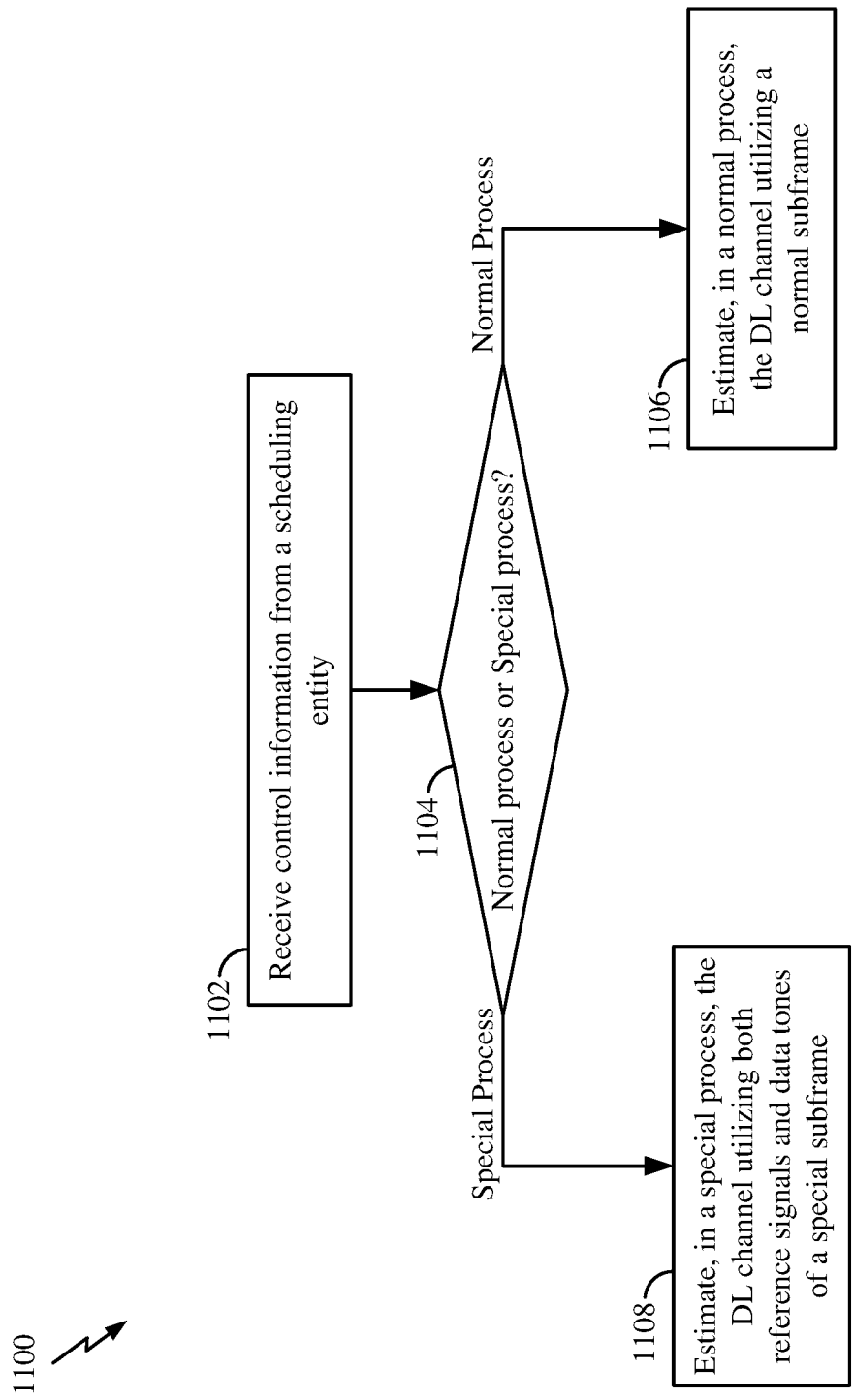
FIG. 11 is a flow chart illustrating an exemplary process for estimating a communication channel using different subframe structures according to some aspects of the disclosure.

FIG. 11 is a flow chart illustrating an exemplary process 1100 for estimating a channel using different processes and subframe structures in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by any of the scheduled entity illustrated in FIGS. 1, 2, 4, and/or 9. In some examples, the process 1100 may be carried out by any suitable apparatus or means for carrying out the functions or algorithm described below.

At block 1102, a scheduled entity may utilize communication block 440 to receive control information from one or more scheduling entities. For example, the scheduled entity may receive control information (e.g., DCI) or other control messages in a DL control channel (e.g., PDCCH) from a base station. At decision block 1104, the scheduled entity determines whether to estimate the channel using a normal process (first process) or a special process (second) based on the control information.

At block 1106, the scheduled entity utilizes a normal process (e.g., default process) for estimating a DL channel using a normal subframe. In this case, the scheduled entity may not be near or at the cell edge. The normal process may be any typical processes known in the art that may be used to estimate the DL channel. For example, the scheduled entity may utilize certain DL reference signals (e.g., R 502 and 504 of FIG. 5) such as the DMRS of a normal subframe to estimate the covariance of the received signal (Ryy) and/or noise (Rnn) of the DL channel.

At block 1108, the scheduled entity utilizes a special process for estimating a DL channel using a special subframe. In this case, the scheduled entity may be at or near the cell edge, and therefore the scheduled entity can use the special process to improve the estimation of the DL channel. The special process is different from the normal process in that the special process utilizes both the reference signals and data signals (e.g., data tones, symbols, or dimensions) of the subframe to estimate the covariance of the received signal (Ryy) and/or noise (Rnn). The special subframe may be the same as the subframe illustrated in FIG. 6. The special subframe may use a lower or less complex MCS than the normal subframe to facilitate the use of the data signals for channel estimation.

In one configuration, the apparatus 300 for wireless communication includes means for communicating with a plurality of scheduled entities including a first scheduled entity and a second scheduled entity through a DL channel; means for configuring the first scheduled entity to utilize a first subframe structure for estimating the DL channel; and means for configuring the second scheduled entity to utilize a second subframe structure, different from the first subframe structure, for estimating the DL channel. The second subframe structure (e.g., a special subframe) is configured to provide more resources (e.g., reference signals and/or data signals) than the first subframe structure (e.g., a normal subframe), for estimating the DL channel. In one aspect, the aforementioned means may be the processor(s) 304 in which the invention resides from FIG. 3 configured to perform the functions recited by the aforementioned means. In another aspect, the aforementioned means may be a circuit or any apparatus configured to perform the functions recited by the aforementioned means.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described in any one of the FIGS. 1, 2, 3, 4, or 9 and utilizing, for example, the processes and/or algorithms described herein in relation to FIGS. 7, 8, 9, 10, and/or 11.

In one configuration, the apparatus 400 for wireless communication includes means for communicating with a scheduling entity utilizing a first subframe structure and a second subframe structure; means for estimating a DL channel utilizing the first subframe structure in a first process; and means for estimating the DL channel utilizing the second subframe structure in a second process that is different than the first process. The second subframe structure (e.g., a special subframe) is configured to provide more resources than the first subframe structure (e.g., a normal subframe), for estimating the DL channel.

In one aspect, the aforementioned means may be the processor(s) 404 in which the invention resides from FIG. 4 configured to perform the functions recited by the aforementioned means. In another aspect, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1, 2, 3, 4, or 9 and utilizing, for example, the processes and/or algorithms described herein in relation to FIGS. 7, 8, 9, 10, and/or 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduling entity, comprising:
   communicating with a plurality of scheduled entities including a first scheduled entity and a second scheduled entity through a downlink (DL) channel;
   configuring the first scheduled entity to utilize a first subframe structure for estimating the DL channel; and
   configuring the second scheduled entity to utilize a second subframe structure, different from the first subframe structure, for estimating the DL channel when the second scheduled entity is located near or at a cell edge of the scheduling entity,
   wherein the second subframe structure is configured to provide more DL resources corresponding to reference signals and data signals than the first subframe structure, for estimating the DL channel.

2. The method of claim 1, further comprising:
   determining to utilize the first subframe structure when the first scheduled entity is located at a first location that is not near or at the cell edge of the scheduling entity.

3. The method of claim 1, wherein the communicating comprises:
   communicating with the first scheduled entity utilizing the first subframe structure based on a first modulation and coding scheme (MCS); and
   communicating with the second scheduled entity utilizing the second subframe structure based on a second MCS that is different from the first MCS.

4. The method of claim 1, wherein the second subframe structure is configured to utilize a modulation and coding scheme (MCS) that has at least one of a less complex modulation or lower coding rate, than the first subframe structure.

5. The method of claim 1, further comprising:
   transmitting a control message to the second scheduled entity, wherein the control message is configured to indicate the first subframe structure or second subframe structure to be utilized for estimating the DL channel.

6. The method of claim 1, further comprising:
   transmitting a control message to the second scheduled entity, wherein the control message is configured to request the second scheduled entity to transmit a sounding reference signal in an uplink (UL) channel.

7. A method of wireless communication operable at a scheduled entity, comprising:
   communicating with a scheduling entity utilizing a first subframe structure and a second subframe structure;
   estimating a downlink (DL) channel utilizing the first subframe structure in a first process; and
   estimating the DL channel utilizing the second subframe structure in a second process that is different than the first process when the scheduled entity is located near or at a cell edge of the scheduling entity,
   wherein the second subframe structure is configured to provide more DL resources corresponding to reference signals and data signals than the first subframe structure, for estimating the DL channel in the second process.

8. The method of claim 7,
wherein the first process is configured to estimate the DL channel when the scheduled entity is not located near or at the cell edge of the scheduling entity.

9. The method of claim 7, wherein the communicating comprises:
communicating with the scheduling entity utilizing the first subframe structure based on a first modulation and coding scheme (MCS); and
communicating with the scheduling entity utilizing the second subframe structure based on a second MCS that is different from the first MCS.

10. The method of claim 7, wherein the second subframe structure is configured to utilize a modulation and coding scheme (MCS) that has at least one of a less complex modulation or lower coding rate, than the first subframe structure.

11. The method of claim 7, further comprising:
receiving a control message from the scheduling entity; and
selecting the first subframe structure or second subframe structure for estimating the DL channel based on the control message.

12. The method of claim 7, further comprising:
receiving a control message from the scheduling entity, wherein the control message is configured to request the scheduled entity to transmit a sounding reference signal; and
transmitting the sounding reference signal.

13. A scheduling entity for wireless communication, comprising:
a communication interface configured to communicate with a plurality of scheduled entities;
a memory stored with executable code; and
a processor operatively coupled to the communication interface and the memory,
wherein the processor is configured by the executable code to:
communicate with the plurality of scheduled entities including a first scheduled entity and a second scheduled entity through a downlink (DL) channel;
configure the first scheduled entity to utilize a first subframe structure for estimating the DL channel; and
configure the second scheduled entity to utilize a second subframe structure, different from the first subframe structure, for estimating the DL channel when the second scheduled entity is located near or at a cell edge of the scheduling entity,
wherein the second subframe structure is configured to provide more DL resources corresponding to reference signals and data signals than the first subframe structure, for estimating the DL channel.

14. The scheduling entity of claim 13, wherein the processor is further configured to:
determine to utilize the first subframe structure when the first scheduled entity is located at a first location that is not near or at the cell edge of the scheduling entity.

15. The scheduling entity of claim 13, wherein the processor is further configured to:
communicate with the first scheduled entity utilizing the first subframe structure based on a first modulation and coding scheme (MCS); and
communicate with the second scheduled entity utilizing the second subframe structure based on a second MCS that is different from the first MCS.

16. The scheduling entity of claim 13, wherein the second subframe structure is configured to utilize a modulation and coding scheme (MCS) that has at least one of a less complex modulation or lower coding rate, than the first subframe structure.

17. The scheduling entity of claim 13, wherein the processor is further configured to:
transmit a control message to the second scheduled entity, wherein the control message is configured to indicate the first subframe structure or second subframe structure to be utilized for estimating the DL channel.

18. The scheduling entity of claim 13, wherein the processor is further configured to:
transmit a control message to the second scheduled entity, wherein the control message is configured to request the second scheduled entity to transmit a sounding reference signal in an uplink (UL) channel.

19. A scheduled entity for wireless communication, comprising:
a communication interface configured to communicate with a scheduling entity;
a memory stored with executable code; and
a processor operatively coupled to the communication interface and the memory,
wherein the processor is configured by the executable code to:
communicate with the scheduling entity utilizing a first subframe structure and a second subframe structure;
estimate a downlink (DL) channel utilizing the first subframe structure in a first process; and
estimating the DL channel utilizing the second subframe structure in a second process that is different than the first process when the scheduled entity is located near or at a cell edge of the scheduling entity,
wherein the second subframe structure is configured to provide more DL resources corresponding to reference signals and data signals than the first subframe structure, for estimating the DL channel in the second process.

20. The scheduled entity of claim 19,
wherein the first process is configured to estimate the DL channel when the scheduled entity is not located near or at the cell edge of the scheduling entity.

21. The scheduled entity of claim 19, wherein the processor is further configured to:
communicate with the scheduling entity utilizing the first subframe structure based on a first modulation and coding scheme (MCS); and
communicate with the scheduling entity utilizing the second subframe structure based on a second MCS that is different from the first MCS.

22. The scheduled entity of claim 19, wherein the second subframe structure is configured to utilize a modulation and coding scheme (MCS) that has at least one of a less complex modulation or lower coding rate, than the first subframe structure.

23. The scheduled entity of claim 19, wherein the processor is further configured to:
receive a control message from the scheduling entity; and
select the first subframe structure or second subframe structure for estimating the DL channel based on the control message.

24. The scheduled entity of claim 19, wherein the processor is further configured to:
receive a control message from the scheduling entity, wherein the control message is configured to request the scheduled entity to transmit a sounding reference signal; and
transmit the sounding reference signal.

* * * * *